(12) United States Patent
Bick

(10) Patent No.: US 8,472,661 B2
(45) Date of Patent: Jun. 25, 2013

(54) METHOD AND APPARATUS FOR TESTING WATER QUALITY USING A CELL-PHONE APPLICATION, MIRROR AND PLASTIC BAG

(76) Inventor: Alison Dana Bick, Short Hills, NJ (US)

( * ) Notice: Subject to any disclaimer, the term of this patent is extended or adjusted under 35 U.S.C. 154(b) by 338 days.

(21) Appl. No.: 12/807,506

(22) Filed: Sep. 7, 2010

(65) Prior Publication Data
US 2012/0057782 A1    Mar. 8, 2012

(51) Int. Cl.
G06K 9/00 (2006.01)
G06K 7/00 (2006.01)
G06K 9/20 (2006.01)
G06K 9/22 (2006.01)

(52) U.S. Cl.
USPC .......................... 382/100; 382/312; 382/313

(58) Field of Classification Search
USPC .................. 382/100, 109–111, 162, 312–313
See application file for complete search history.

(56) References Cited

U.S. PATENT DOCUMENTS

| | | | |
|---|---|---|---|
| 4,626,992 A * | 12/1986 | Greaves et al. | 600/300 |
| 5,660,998 A * | 8/1997 | Naumann et al. | 435/34 |
| 7,132,254 B2 * | 11/2006 | Vincent | 435/29 |
| 7,505,857 B2 | 3/2009 | Howell et al. | |
| 7,542,855 B2 | 6/2009 | Sihalla | |
| 2004/0243318 A1 * | 12/2004 | Ogawa et al. | 702/22 |
| 2008/0153125 A1 * | 6/2008 | Buttry et al. | 435/30 |
| 2010/0129852 A1 * | 5/2010 | Putnam et al. | 435/29 |
| 2011/0136165 A1 * | 6/2011 | Vojnovic et al. | 435/39 |

OTHER PUBLICATIONS

F.D. Whistler, J. Young, W.F. Miller, Aerial Surveillance to Monitor Water Quality in Catfish Ponds, Proceedings (1976).
M.A.J. Rodgers et al., Lifetime of 02 (I A,) in Liquid Water as Determined by Time-Resolved Infrared Luminescence Meas . . . Society J. Am. Chem., SOL. 1982, 104, 5541 (1982).
P. Newton, Multi-component Pattern Recognition and Differentiation Method Analytical Chemistry vol. 44, No. 14 (Dec. 1972).

* cited by examiner

Primary Examiner — Li Liu

(57) ABSTRACT

The present disclosure teaches a practical method and apparatus for providing accurate, economic drinking water testing using materials available worldwide: a mirror 10, cell-phone 20, and a plastic bag 30. Cell-phone 20 contains a C# computer application which captures color digital images of water whose water quality is desired, processes said color digital images, and displays information suitable for determining water quality on said cell-phone. The present invention is susceptible to use by the majority of persons capable of cell-phone operation.

4 Claims, 4 Drawing Sheets

METHOD AND APPARATUS FOR TESTING WATER QUALITY USING A CELL-PHONE APPLICATION, MIRROR AND PLASTIC BAG

BACKGROUND OF THE INVENTION

1. Field of the Invention

The present disclosure relates to a method for the qualitative measurement, by means of a cell-phone capable of emitting the florescent and phosphorescent wavelength light spectrum, capturing images, and image processing, of the water qualities, including alkalinity, ammonia, dissolved oxygen, turbidity, pH, coliform bacteria and E. coli levels in a water sample, and to an apparatus for implementing the method.

2. Background of the Invention

Availability of water is perhaps the most essential factor in determining where humans can live, grow food, and develop industry. The United Nations issued a report stating nearly 5,000 children die each day due to a lack of clean water, according to http://news.softpedia.com/news/Lack-of-Clean-Water-Kills-2-Million-Children-a-Year-39814.shtml, last visited Sep. 4, 2010. Additionally, with the rise of terrorism, the likelihood of an attempt to contaminate a municipal fresh-water supply is more likely than ever. Public water treatment facilities are only effective against some replicating (infectious) agents, and a few biotoxins are inactivated by chlorine, according to W. Dickinson Burrows and Sara E. Renner, Environmental Health Perspectives, Volume 107, Number 12, December 1999. Even the popular press has expressed concerns about the availability of water and water quality tests, as evidenced by a series of New York Times articles, according to C. Torchia, UN Warns of Rising Demand for Clean Water, Associated Press (Mar. 16, 2009). Natural disasters also give rise to the need for a system and method of water quality testing which is easy to use, yields quick and accurate results, is inexpensive, and is generally available to the public.

In Third World countries such a device could save millions of lives and billions of dollars as considerable capital is spent finding, moving, storing, and purifying water for human consumption, according to Comprehensive Environmental Response, Compensation and Liability Act (Cercla, or Superfund), U.S. Senate Report—Update, U.S. Environmental Protection Agency (2007). In First World countries such a device could help inhabitants by permitting them to self-assess water quality in the event of a natural disaster or terrorist attack.

Therefore, there is an urgent need for a faster, simpler, low-cost, real-time device suitable for water testing throughout the world for reasons of health and national security. Standard water quality tests include the following: Mardel Test Strips® for pH, ammonia, and alkalinity; Vernier Lab-Pro® with appropriate probes for dissolved oxygen; and Colilert-18, fifteen test tube test for coliform bacteria and E. coli. Some commercially available tests for water quality are subject to human error, chemical reaction failures, and mechanical calibration failures. Additionally, most water quality testing equipment is unavailable to the general public. These shortcomings result in unnecessarily high costs, slow results, and inaccurate information.

In addition to the standard tests noted above, in the past people have employed photography to determine water quality. In particular, aerial photography has been used to determine water pollution in catfish ponds, according to F. D. Whistler, J. Young, W. F. Miller, Aerial Surveillance To Monitor Water Quality in Catfish Ponds, Proceedings (1976). Others have used luminescence to determine dissolved oxygen levels in surface water, according to M. A. J. Rodgers and P. T. Snowden, Lifetime of O2 (1 A,) in Liquid Water As Determined by Time-Resolved Infrared Luminescence Measurements, American Chemical Society J. Am. Chem. SOL. 1982, 104, 5541 (1982). Lastly, pattern recognition is used for water quality assessment, according to P. Newton, Multi-component Pattern Recognition and Differentiation Method Analytical Chemistry Vol. 44, No. 14 (December 1972). The present disclosure uses a combination of those three elements, photography, luminescence, and pattern recognition to determine alkalinity, ammonia, dissolved oxygen, turbidity, pH, coliform bacteria and E. coli water qualities in water samples.

For the past two years, a water quality device has been developed which attempted to overcome most of these shortcomings. In particular, a device composed of a computer, a camera and shoe box whose interior was painted with florescent and phosphorescent paint and subsequently, using a cell-phone to replace the computer and the camera. These devices were presented at the New Jersey Regional Science Fair on Mar. 20, 2009. Details of the presentation can be found on the website http://www2.research.att.com/~kbl/njrsf/index.html and clicking on home>past fair>NJRSF 2009>Abstracts (last visited Sep. 4, 2010). In particular the following abstract of the presentation is as follows:

"EN.19: Evaluation of Cell Phone as Novel Water Quality Testing Apparatus, Alison Dana Bick, Millburn H. S.: The availability of water is perhaps the most essential factor in determining where humans can live, grow food, and develop industry. Existing water quality tests are subject to human error, chemical reaction failures, and mechanical calibration failures. These shortcomings result in unnecessarily high costs, slow results, and inaccuracies. Currently, large computers and high cost cameras are used to assess water quality. Using readily available equipment, an apparatus was created and tested which overcame some of the shortcomings associated with traditional water quality testing systems. This project created and tested a low cost, highly effective, water quality testing apparatus composed of a cell phone, fluorescent and phosphorescent paint and a simple enclosure. Evaluation of the data required the creation of a novel stepwise regression statistical methodology and the novel use of an image analysis program. With a 95% confidence level, the apparatus can assess ammonia and alkalinity in water samples with the accuracy comparable to a commercially available testing apparatus. During the past three years the novel apparatus has morphed from a system composed of a large computer, a digital camera, and auxiliary equipment into a customized programmed cell phone. This year, a microfluidic lab-on-a-chip was fabricated and represents the next step of the novel water quality apparatus s metamorphosis. Additionally, a mathematical proof of the novel stepwise regression statistical methodology has been drafted."

The devices referred to above have two significant shortcomings, in particular they could only accurately detect inorganic water qualities and they required custom made elements, in particular, the florescent and phosphorescent painted shoe box. Thus these devices could not test a sufficient range to determine suitable drinking water and they were not readily available.

Recently, a novel apparatus and method eliminated the custom made elements of these devices by adding new and additional software programs to the cell-phone element of these devices, plus a mirror element, to overcome the shortcomings of these devices. The present invention is capable of accurately detecting both inorganic and organic water qualities. With a confidence level of 80% or greater for inorganic qualities, 65% or greater for organic qualities, the present invention will yield the same results as the results generated by commercially available water-quality tests. The entire device can be made from one cell-phone, plastic bag and mirror. These elements are readily available worldwide and thus the present invention would prove invaluable in determining water quality for the purpose of determining if the water is drinkable by a member of the general public in the event of a natural disaster or terrorist attack.

The present invention discloses that commercially available cell-phones can be programmed to directly assess images of water illuminated by the wavelength spectrum emanating from a cell-phone screen display, nominally 430 to 640 nanometers. This spectrum mimics fluorescent light with graphical peaks of approximately 1,400 photocount intensity at about 460 nanometers; approximately 3,700 photocount intensity at about 560 nanometers, and approximately 3,800 photocount intensity at about 625 nanometers.

The cell-phone uses standardized, pixel-intensity data correlated with water qualities, generated by the software of the current disclosure. In particular, the cell-phone can accurately determine the alkalinity, ammonia, dissolved oxygen, turbidity, pH, coliform bacteria, and *E. coli* levels of a sample. In short, a cell-phone can be programmed to evaluate water samples to detect pathogens, chemicals, and other biological contaminants more quickly, less expensively, and generating results essentially similar to commercial water-quality tests. The present invention also demonstrates that most cell-phones can be remotely converted into water quality testing apparatuses, merely by downloading an application and employing a mirror and transparent container such as a drinking glass or clear plastic bag. Thus in the event of an emergency, a cell-phone can be rapidly converted into a water-quality testing device.

Reference is now made to the accompanied drawings from which form a part of the specifications of the present invention. In the drawings, closely related figures have the same number. FIGS. one to four show various perspectives of the present invention.

REFERENCE NUMERALS IN DRAWINGS

Figure 1:
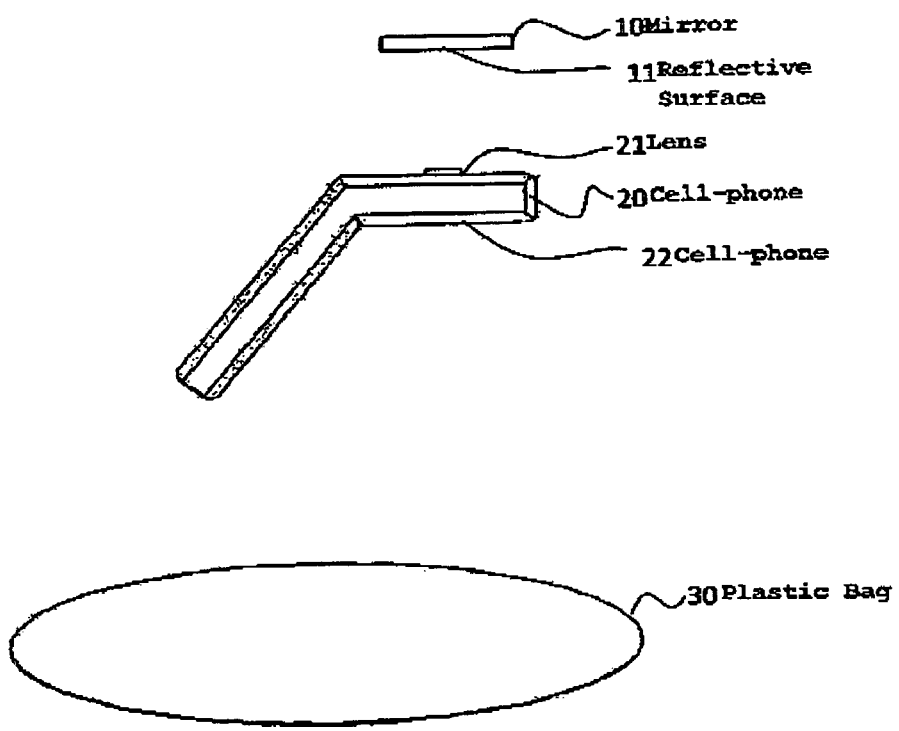
FIG. 1 shows a top view of the elements of the apparatus in accordance with the present invention.
Figure 2:
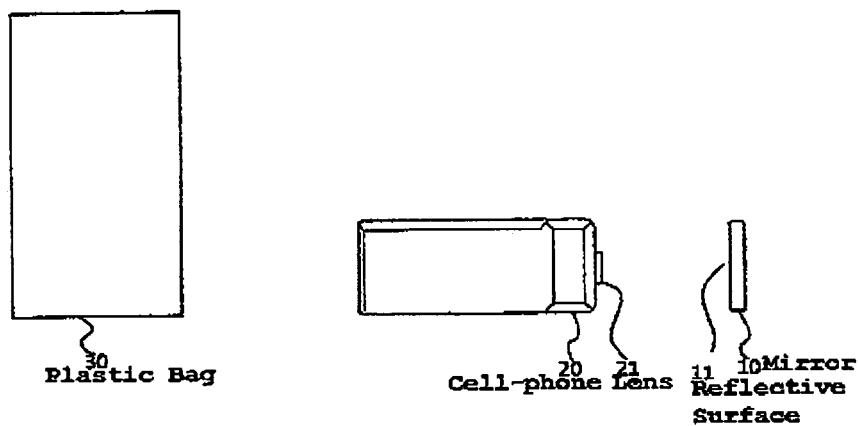
FIG. 2 shows a left view of the apparatus in accordance with the present invention.
Figure 3:
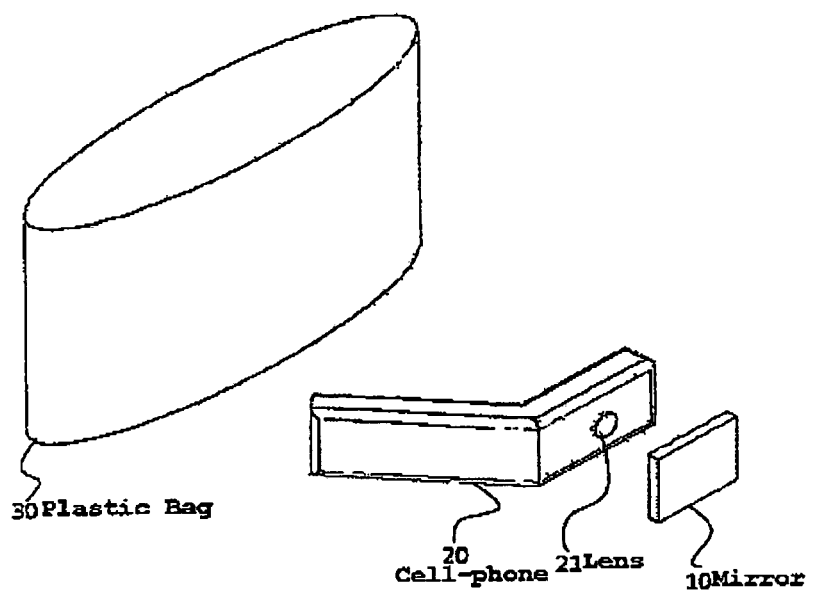
FIG. 3 shows a perspective view of the apparatus in accordance with the present invention.
Figure 4:
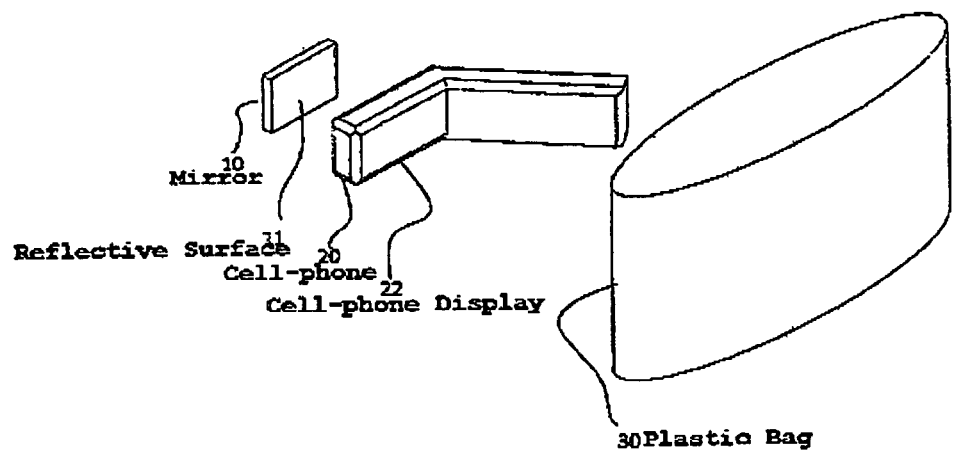
FIG. 4 shows a perspective view of the apparatus in accordance with the present invention.

The figures disclose a mirror element 10; cell-phone 20 (depicted as a flip-style phone in the opened position), lens 21 of cell-phone camera, display screen 22 of cell-phone, and a transparent plastic bag 30.

SUMMARY OF THE INVENTION

In accordance with the present invention a set of elements comprising mirror 10, with a reflective surface 11, a cell-phone 20 having a camera on one side and a cell-phone display 22 on the opposite side and capable of capturing, processing, and storing images, with a cell-phone display 22 capable of emitting a light wavelength spectrum from about 430 to 670 nanometers and displaying water quality results, and a drinking glass or plastic bag 30 capable of holding 900 ML of water to be tested.

DETAILED DESCRIPTION OF THE INVENTION

The elements of a typical embodiment of the present invention are depicted in FIG. 1, FIG. 2, FIG. 3, and FIG. 4. Referring in particular to FIG. 1, the invention includes a flat mirror 10. In the preferred embodiment, mirror 10 has an area of at least 2 inches by 2 inches which should be self supporting, but neither a specific mirror size nor a self supporting feature are required. The reflective surface 11 of mirror 10 should face lens 21, in the preferred embodiment said reflective surface 11 should be between 3 and 4 inches from lens 21 of cell-phone 20. Cell-phone 20 must include a camera and be position so as to be capable of capturing an image from the reflective surface 11 of mirror 10 of water whose qualities are desired. Cell-phone 20 must be able to transfer said captured image to the digital processor in cell-phone 20. Said processor has the capability of receiving said captured image, the ability to run C# programming application, and be capable of outputting the results of said C# computer application to cell-phone display 22.

Said C# computer application has the capability of
  a. receiving and storing standardized pixel lookup table containing values assigned to a photograph of water-quality samples with known water-quality characteristics,
  b. receiving and storing a test pattern image,jj
  c. display said test pattern image on cell-phone display 22,
  d. input and store said captured image,
  e. processing said captured image to assign pixel color and intensities to said captured image, said assignment is made by matching the pixel color and intensity of the captured image against the closest color and pixel intensity of the element of the pixel lookup table,
  f. store said processed pixel color and intensities of said captured image,
  g. compare said processed image pixel color and intensities to said standardized pixel lookup table,
  h. based on said comparison assign a water quality characteristic to said captured image, and
  i. display said water quality characteristic assigned to said captured image on cell-phone display 22.

Said C# computer application calls a first subroutine having the capability of creating said standardized pixel lookup table by
  a. retrieving and storing a digitized color image of a water sample with known water qualities,
  b. processing said digitized color image to assign pixel color and intensities to said digitized color image,
  c. retrieving and storing the known water quality characteristics associated with said digitized color image, and
  d. store in said standardized pixel lookup table said water quality characteristics associated with said assigned pixel color and intensities.

The completed standardized pixel lookup table facilitates the rapid assignment of water quality characteristics to said captured images of water whose qualities are desired.

Said C# computer application calls a second subroutine having the capability of creating, storing, and displaying eight equal sized rectangles on cell-phone display 22. In the preferred embodiment said rectangles are displayed side by side, but any shape may be displayed so long as the area of each shape is equal. In the preferred embodiment each rectangle is of a constant color, hence emitting a constant light wavelength. Said test pattern image is capable of emitting a minimum wavelength between 430 and 470 nanometers and a maximum wavelength between 640 and 670 nanometers. Said rectangles each display a unique wavelength which about 30 nanometers greater than the wavelength displayed by any rectangle which is contiguous. In the preferred embodiment of the present invention, a. the first rectangle of said test pattern image displays a wavelength of 445 nanometers,
b. the second rectangle of said test pattern image displays wavelength of 475 nanometers,
c. the third rectangle of said test pattern image displays wavelength of 505 nanometers,
d. the fourth rectangle of said test pattern image displays wavelength of 535 nanometers,
e. the fifth rectangle of said test pattern image displays wavelength of 565 nanometers,
f. the sixth rectangle of said test pattern image displays wavelength of 595 nanometers,
g. the seventh rectangle of said test pattern image displays wavelength of 625 nanometers, and
h. the eighth rectangle of said test pattern image displays wavelength of 655 nanometers.

To use the present invention, fill plastic bag 30 with water whose water qualities are desired. Place mirror 10 three to four inches from plastic bag 30 so that said reflective surface 11 of mirror 10 is parallel to and facing the length of plastic bag 30. Position cell-phone 20 between reflective surface 11 and plastic bag 30 such that display 22 is parallel to, and approximately one inch from plastic bag 30; and lens 21 is approximately two or three inches from reflective surface 11. Activate cell-phone 20; in the preferred embodiment this is accomplished by touching the appropriate area of cell-phone 20 keypad. Activate said C# computer application; in the preferred embodiment this is accomplished by touching the appropriate area of cell-phone 20 keypad. Said activation automatically displays said test pattern image, and subsequently captures the color image of water whose water qualities are desired. Cell-phone 20 subsequently uses said C# computer application and displays the desired water qualities on cell-phone display 22. In the present invention the preferred embodiment displays the following water qualities simultaneously: alkalinity, ammonia, dissolved oxygen, turbidity, pH, coliform bacteria and *E. coli.*

Accordingly, the present invention is a faster, simpler, low-cost, more available device suitable for water testing throughout the world. Present invention can be used to determine alkalinity, ammonia, dissolved oxygen, turbidity, pH, coliform bacteria and *E. coli* in 5 seconds to 2 minutes, as compared to the time of 2 minutes to 18 hours to determine alkalinity, ammonia, dissolved oxygen, turbidity, pH, coliform bacteria and *E. coli* levels for existing devices and methods. Present invention does not require a skilled operator; rather any user capable of operating a cell-phone can use the present invention. Present invention can be secured for the cost of a mirror, cell-phone, and plastic bag which is significantly less than the cost of devices and methods capable of determining alkalinity, ammonia, dissolved oxygen, turbidity, pH, coliform bacteria and *E. coli.* Present invention is composed of elements which are widely available throughout the world, where as existing devices and methods capable of determining alkalinity, ammonia, dissolved oxygen, turbidity, pH, coliform bacteria and *E. coli.*

While the preferred embodiment utilizes one cell-phone 20 and mirror 10, alternate embodiment improving the confidence level to 95% or greater for inorganic qualities, and 80% or greater for organic qualities. In an alternate embodiment, two cell-phones 20 and one plastic bag 30 are used. The cell-phones 20 straddle the plastic bag 30, with one cell-phone 20 emits luminescence while the other cell-phone 20 captures, processes and displays water quality.

In an additional alternate embodiment, a personal computer could be substituted for cell-phone 20 in the preferred embodiment.

The present invention should not be construed as limited to water quality. The principles disclosed may be applied in alternative embodiments to assess qualities of other translucent fluid substances such as vinegar or other aqueous solutions, an translucent solids, for quality-control and analyses.

Although the description above contains many specifications, these specifications should not be construed as limiting the scope of the present invention but these specifications are merely provided to illustrate some of the present inventions preferred embodiments of the present invention. Thus the scope of the invention should be determined by the appended claims and their legal equivalents, rather than by the examples given.

I claim:

1. An apparatus for testing a water sample comprising:
a cell-phone having
an opposing lens and a display screen,
capability of capturing color images,
receiving and storing digital data,
processing digital data,
emitting light in a spectrum of approximately 430 to 670 nanometers, and
displaying text;
a plastic bag containing said water sample and
a mirror reflective surface,
wherein
said reflective surface is placed facing and proximate to said bag,
said cell-phone is placed such that said display screen is parallel and proximate to said bag, and
said lens is proximate to and facing said reflective surface.

2. An apparatus for testing a water sample comprising:
a digital computer having
an opposing lens and a display screen,
capability of capturing color images,
receiving and storing digital data,
processing digital data,
emitting light in a spectrum of approximately 430 to 670 nanometers, and
displaying text;
a plastic bag containing said water sample and
a mirror with a reflective surface
wherein
said reflective surface is placed facing and proximate to said bag,
said cell-phone is placed such that said display screen is parallel and proximate to said bag, and
said lens is proximate to and facing said reflective surface.

3. A method or using a cell-phone, a mirror and a plastic bag to measure water quality characteristics said method comprising
providing a water sample in said bag,
providing said mirror with a reflective surface,
placing said reflective surface facing and proximate to said bag,
providing said cell-phone having a processor capable of manipulating digital data an opposing lens and display screen, placing said cell-phone such that said display screen is parallel and proximate to said bag and said lens is proximate to and facing said reflective surface, activating a software program in said cell-phone, further comprising the steps of
a. creating and storing a standardized pixel lookup table,
b. receiving and storing a test pattern image,
c. displaying said test pattern image an said display screen,
d. capturing an image of said water sample in said bag,
e. inputting and storing said captured image,
f. processing said captured image to assign pixel color and intensities,
g. storing said processed pixel color and intensities of said captured image,
h. comparing said processed image pixel color and intensities to said standardized pixel lookup table,
i. selecting and assigning said water quality characteristics to said captured image, and
j. displaying said water quality characteristics assigned to said captured image on said display screen.

4. The method according to claim 3 wherein said standardized pixel lookup table is converted into a formula using standard regression analysis.

\* \* \* \* \*